Oct. 29, 1929.  A. E. ANDERSON  1,733,853
AUTOMATIC RECLOSING CIRCUIT BREAKER SYSTEM
Filed Nov. 29, 1926
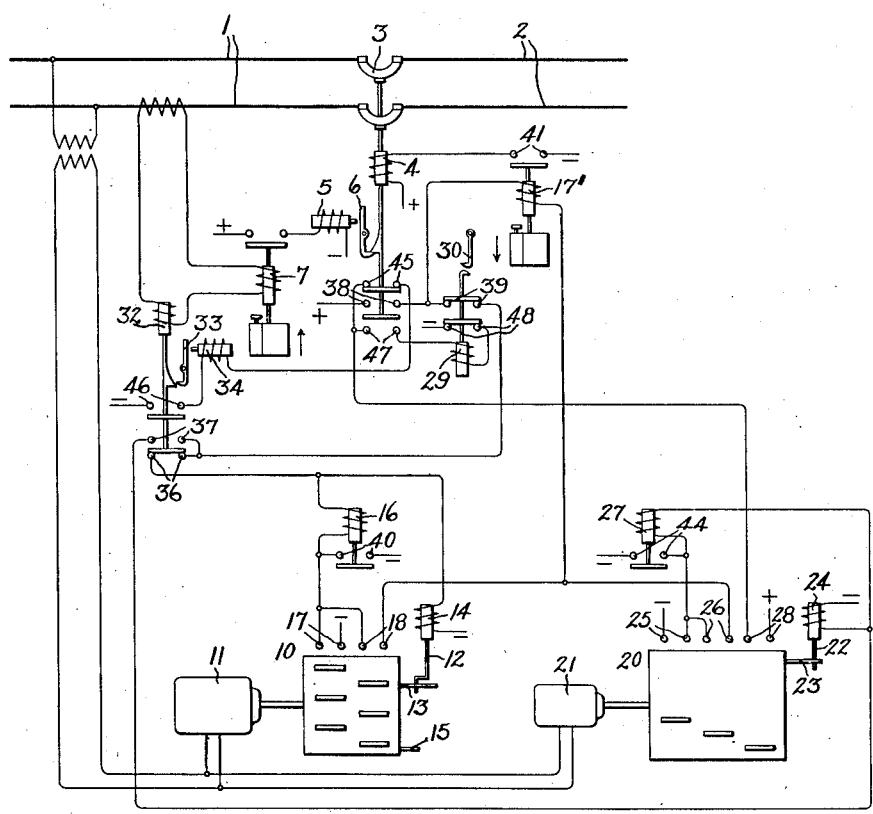
Inventor:
Arvid E. Anderson,
by
His Attorney.

Patented Oct. 29, 1929

1,733,853

UNITED STATES PATENT OFFICE

ARVID E. ANDERSON, OF SCOTIA, NEW YORK, ASSIGNOR TO GENERAL ELECTRIC COMPANY, A CORPORATION OF NEW YORK

AUTOMATIC RECLOSING CIRCUIT-BREAKER SYSTEM

Application filed November 29, 1926. Serial No. 151,370.

My invention relates to an automatic reclosing circuit breaker system and its object is to provide an improved arrangement whereby the reclosing of the circuit breaker is controlled in a certain manner when the breaker is opened in response to certain abnormal conditions and is controlled in a different manner when the circuit breaker is opened in response to other abnormal conditions.

In accordance with a preferred embodiment of my invention, an overload circuit breaker is arranged to be reclosed after it has been open a predetermined length of time, when the overload which causes the circuit breaker to open is less than a certain value, and is arranged to be reclosed after it has been open a different predetermined length of time, when the overload, which causes the circuit breaker to open, is greater than the predetermined value.

My invention will be better understood from the following description, taken in connection with the accompanying drawing, which shows an automatic reclosing circuit breaker system embodying my invention, and its scope will be pointed out in the appended claims.

Referring to the drawing, 1 and 2 represent two electric circuits which are adapted to be connected together by a circuit breaker 3 of any suitable type, examples of which are well known in the art. 1 may be a supply circuit supplied with current from any suitable source of current, not shown, and 2 may be a load circuit which is supplied with current from the supply circuit 1 when the circuit breaker 3 is closed.

As shown, the circuit breaker 3 is provided with a closing coil 4 which, when energized, closes the circuit breaker, and a trip coil 5 which, when energized, releases a latch 6 which is arranged to hold the circuit breaker in its closed position after circuit breaker has been closed and the closing coil 4 has been deenergized. The circuit of the trip coil 5 is controlled by an overload relay 7 whose coil is connected to the supply circuit 1 so that the circuit of the trip coil 5 is completed across a suitable source of control current when the current supplied from the supply circuit to the load circuit exceeds a predetermined amount.

Whenever the circuit breaker is opened in response to an overload which is less than a predetermined amount, it is desirable to reclose the circuit breaker within a relatively short time after it has opened, so that service may be quickly restored on the load circuit in case the abnormal condition, which caused the circuit breaker to open, is of short duration. If the abnormal condition remains connected to the load circuit so that the breaker opens each time it is reclosed, it is desirable to reclose the circuit breaker a plurality of times with varying time intervals between successive reclosures and to prevent further reclosures if the circuit breaker fails to remain closed after being reclosed a predetermined number of times within a predetermined length of time after the first opening.

Such arrangements are well known in the art, and in the drawing, I have shown one of the well known reclosing arrangements for accomplishing this result. This reclosing arrangement comprises a timer 10 and a driving motor 11 therefor, which is permanently connected to the supply circuit 1. The motor 11 is normally prevented from rotating by a stop 12 which engages a projection 13 on the timer. The stop 12 is arranged to be moved out of engagement with the projection 13 by a release magnet 14 whenever it is energized. This magnet 14 is arranged to be energized when the circuit breaker 3 is open. The stop 12 is also arranged to engage another projection 15 on the timer if the magnet 14 is energized when the timer has reached a predetermined position after having effected a predetermined number of reclosures of the circuit breaker. This position is called the lockout position, and when the timer is held in this position, further operation of the timer to effect reclosure of the circuit breaker is prevented although the circuit breaker 3 may be open.

The timer is provided with the sets of contacts 17 and 18, which are arranged to be closed in a predetermined sequence as the timer is rotated. The timer is arranged so that only one of the sets of contacts is closed at any instant. When the contacts 17 are closed, a circuit is completed for a control relay 16 if the circuit breaker 3 is open, and the relay in closing completes a locking circuit for itself so that when the contacts 17 are subsequently opened, the relay remains energized so long as the circuit breaker remains open. When the contacts 18 are closed, a circuit is completed for a suitable control relay 17', shown as a hesitating control relay, if the control relay 16 is still energized. The energization of the control relay 17' completes the circuit of the closing coil 4 to close the circuit breaker.

When the circuit breaker is opened in response to a very severe overload, which is of such a character that it would damage the circuit breaker if it were reclosed in the foregoing manner, it is desirable to provide means whereby, under such conditions, the reclosing of the circuit breaker is controlled in a different way. In accordance with my invention, I provide an arrangement whereby the control of the reclosing of the circuit is transferred to another timer 20 whenever the circuit breaker is opened by a current above a predetermined value. The timer 20 is similar to the timer 10, except that the time interval between the opening and first reclosure of the circuit breaker is increased materially and the breaker is locked out if it fails to remain closed after its first reclosure. My invention, however, is not limited to a reclosing arrangement which locks the breaker out after its first reclosure, but the reclosing device may be arranged to reclose the circuit any desired number of times with any desired predetermined time interval between successive reclosures.

The timer 20 is arranged to be driven by a motor 21 which is permanently connected to the supply circuit 1. The motor 21 is normally prevented from rotating by a stop 22 which engages a projection 23 on the timer. The stop 22 is arranged to be moved out of engagement with the projection 20 by a release magnet 24 whenever it is energized. The timer 20 is provided with the sets of contacts 25 and 26 which are arranged to be closed successively as the timer rotates. These sets of contacts are so arranged that only one set is closed at any instant. When the contacts 25 are closed, an energizing circuit for the relay 27 is completed if the circuit breaker 3 is open. The relay 27, when energized, completes a locking circuit for itself, which is independent of the contacts 25. When the contacts 26 are subsequently closed, a circuit is completed for the control relay 17' through the contacts of the relay 27, if it is energized, to effect the closing of the circuit breaker.

The timer 20 is provided with a third set of contacts 28 which are closed after the contacts 25 and 26 have been closed, to complete the circuit of a lockout relay 29 if the circuit breaker opens again within a predetermined time after the reclosure which is effected by the closing of the contacts 26. The relay 29 is arranged in any suitable manner, so that it is held in its energized position after the coil thereof has been deenergized. As shown, a latch 30 is provided for holding the relay in its energized position. The relay 29, when in its energized position, opens the circuits of both of the release magnets 14 and 24, thereby rendering both of the timers 10 and 20 inoperative to reclose the circuit breaker, although the circuit breaker 3 may be open.

For selectively controlling the timers 10 and 20 in accordance with the severity of the overload so that the timer 10 is normally arranged to control the reclosing of the circuit breaker 3 and the timer 20 is arranged to control the reclosing only when the overload exceeds a predetermined value, I provide a control transfer relay 32 which is connected to the supply circuit 1 in any suitable manner so that it is energized in accordance with the current supplied to the load circuit 2. The transfer relay 32 is arranged to be operated whenever the current through it exceeds a predetermined value, which is greater than the value at which the overload relay 7 operates. The transfer relay 32 is also preferably arranged so that it operates more quickly than the relay 7 in order to insure that it completes its operation before the circuit breaker 3 can open in response to the operation of the relay 7. The transfer relay 32 is arranged to be held in its energized position by any suitable means, examples of which are well known in the art. As shown in the drawing, a latch 33 is provided for holding the relay in its energized position after the overload coil of the relay 32 is deenergized. The latch 33 is arranged to be tripped by a trip coil 34, which is energized by the closing of the contacts 28 of the timer 20 if the circuit breaker 3 is in its closed position at the same time.

The transfer relay 32, when in its deenergized position, closes contacts 36 in the circuit of the release magnet 14 of the timer 10, and when in its energized position closes contacts 37 in the circuit of the release magnet 24 of the timer 20. Therefore, whenever the transfer relay 32 is in its deenergized position when the circuit breaker 3 opens, the timer 10 operates to control the reclosing of the circuit breaker and whenever the transfer relay 32 is in its energized position when the circuit breaker 3 opens, the timer 20 operates to control the reclosing of the circuit breaker.

The operation of the system shown is as follows: Under normal load conditions, the circuit breaker 3 is held closed by the latch 6 and the control devices are in the positions shown in the drawing. The driving motors 11 and 21 of the timers 10 and 20 respectively are energized but the stops 12 and 22 prevent the timers from rotating.

When an overload occurs which is sufficient to cause the overload relay 7 to close its contacts, a circuit is completed for the trip coil 5, which releases the latch 6 and permits the circuit breaker 3 to open.

If the overload is not severe enough to operate the transfer relay 32, the closing of the auxiliary contacts 38 on the circuit breaker when it opens, completes a circuit for the release magnet 14 of the timer 10. This circuit is from one side of a suitable source of control current, through contacts 38 on the circuit breaker, contacts 39 of the lockout relay 29, contacts 36 of the transfer relay 32, coil of release magnet 14 to the other side of the control circuit. The energization of the magnet 14 moves the stop 12 out of engagement with the projection 13 so that the motor 11 can rotate the timer.

A predetermined time after the timer is started, the contacts 17 are closed to complete a circuit for the control relay 16. This circuit is from one side of a suitable source of control current, through contacts 38 on the circuit breaker 3, contacts 39 of the lockout relay 29, contacts 36 of the overload relay 32, coil of relay 16, contacts 17 of timer 10 to the other side of the control circuit. The closing of the contacts 40 of the relay 16, when it is energized, completes a circuit in parallel with the contacts 17 of the timer 10 so that the relay 16 remains energized after the contacts 17 are subsequently opened.

Further rotation of the timer 10 opens the contacts 17 and subsequently effects the closure of the contacts 18 to complete a circuit for the hesitating control relay 17'. This circuit is from one side of a suitable source of control current, through contacts 38 on the circuit breaker 3, coil of relay 17', contacts 18 of the timer 10, contacts 40 of the control relay 16, to the other side of control circuit. The closing of the contacts 41 of the hesitating control relay 17', when it is energized, completes a circuit for the closing coil 4 to effect closure of the circuit breaker. This circuit is from one side of the suitable control circuit, through closing coil 4, contacts 41 of the hesitating control relay 17' to the other side of the control source. The opening of the auxiliary contacts 38 on the circuit breaker when it closes, immediately deenergizes the control relays 16 and 17' and the release magnet 14, and after a predetermined time, the hesitating relay 17' opens the closing coil circuit.

If the overload has disappeared by the time the circuit breaker is reclosed, the breaker remains closed. The motor 11, however, continues to drive the timer 10 until it reaches its normal position, in which position the stop 12 engages the projection 13. Since the release magnet 14 is deenergized, the projection 15 does not engage the stop 12 when the timer reaches its lockout position.

If there is still an overload connected across the load circuit when the circuit breaker 3 is reclosed, the overload relay 7 again operates to trip open the circuit breaker 3 and the timer 10 continues its rotation and again operates in the same manner as above described to reclose the circuit breaker after it has been open a predetermined length of time, which preferably is longer than the time between the first opening and the first reclosure.

With the arrangement shown, the timer will effect the reclosure of the circuit breaker three times, but obviously it may be any desired number of times. If the breaker opens immediately after the third reclosure so that the release magnet 14 is energized when the timer reaches its lockout position, the projection 15 engages the stop 12 and the timer is held in its lockout position and further automatic reclosing is prevented until stop 12 is moved out of engagement with the projection 15.

If, when the circuit breaker 3 opened the first time, or after any one of its reclosures which were effected by the operation of the timer 10, the overload which caused the circuit breaker to open was severe enough to cause the transfer relay 32 to operate. The opening of the contacts 36 and the closing of the contacts 37 of the relay 32 transfers the control of the reclosing of the circuit breaker to the timer 20. If the timer 10 is in operation when the transfer relay 32 is operated, the timer merely continues its rotation until it reaches its normal position, where it is stopped by the stop 12 engaging the projection 13. During this movement of the timer, the closing of the contacts 17 and 18 have no effect, since the circuit of the relay 16 is open at the contacts 36 of the transfer relay 32.

The closing of the contacts 37 of the transfer relay 32 connects the coil of the release magnet 24 of timer 20 to the auxiliary contacts 38 on the circuit breaker 3 so that when the circuit breaker is open, a circuit for the magnet 24 is completed to release the timer 20. This circuit is from one side of a suitable control circuit, through contacts 38 on the circuit breaker 3, contacts 39 of the lockout relay 29, contacts 37 of relay 32, coil of release magnet 24, to the other side of the control circuit.

After the timer 20 has rotated a predetermined amount, the contacts 25 are closed and complete a circuit for the control relay 27. This circuit is from one side of a suitable source of control current, through the contacts 38 on the circuit breaker, contacts 39 of the lock-out relay 29, contacts 37 of the relay 32, coil of relay 27, contacts 25 of timer 20, to the other side of the control source. The relay 27, by closing its contacts 44, completes a locking circuit which is independent of the contacts 25. Upon further rotation of the timer, the contacts 25 are opened and the contacts 26 are closed, and complete a circuit for the hesitating control relay 17' through the contacts 44 of the relay 27. The energization of the control relay 17' effects the closing of the circuit breaker 3 in the manner heretofore described. The opening of the auxiliary contacts 38 of the circuit breaker 3, when it is closed, immediately deenergizes the control relays 16 and 27 and the release magnet 24, and after a predetermined time the hesitating control relay 17' opens the circuit of the closing coil 4.

If the overload has disappeared by the time the breaker is reclosed, the closing of the contacts 28 of the timer 20, which are closed after the contacts 26 are opened, completes a circuit for the trip coil 34 of the transfer relay 32, so that the relay is restored to its normal position, thereby rendering the timer 10 operative to control the reclosing of the circuit breaker when it is subsequently opened by an overload which is not severe enough to operate the transfer relay 32. The circuit of the trip coil 34 is from the one side of a suitable source of control current, through the contacts 28 of the timer 20, auxiliary contacts 45 on the circuit breaker 3, trip coil 34, contacts 46 of the transfer relay 32 to the other side of the control circuit.

If the overload is still connected to the load circuit when the circuit breaker is reclosed, so that it is tripped open before the timer 20 closes its contacts 28, the closing of these contacts 28 completes a circuit for the lockout relay 29 to render the entire reclosing equipment inoperative to reclose the circuit breaker until the relay 29 is reset by hand. The circuit for the lockout relay is from one side of a suitable source of control circuit, through contacts 28 on the timer 20, auxiliary contacts 47 on the circuit breaker 3, coil of the relay 29, contacts 48 of the relay 29, to the other side of the control source.

The relay 29, by opening its contacts 48, opens its own energizing circuit, and by opening its contacts 39, opens the circuits of both of the release magnets 14 and 24, so that neither of them can be energized until the relay 29 is reset by hand. After closing its contacts 28, the timer 20 continues rotating until it reaches its normal position, where it is stopped by the projection 23 engaging the stop 22.

While I have, in accordance with the patent statutes, shown and described my invention as applied to a particular system and as embodying various devices diagrammatically indicated, changes and modifications will be obvious to those skilled in the art, and I therefore, aim in the appended claims to cover all such changes and modifications as fall within the true spirit and scope of my invention.

What I claim as new and desire to secure by Letters Patent of the United States, is:

1. In an automatic reclosing circuit breaker system, an electric circuit, a circuit breaker in said circuit, means for effecting the opening of said circuit breaker, control means operative to effect the next reclosure of said circuit breaker after a predetermined time interval each time said circuit breaker is opened, control means operative to effect the next reclosure of said circuit breaker after a different predetermined time interval each time said circuit breaker is opened, and means controlled by the condition of said circuit at the time the opening of the circuit breaker is effected for selectively determining which of said control means will effect the next reclosure of said circuit breaker.

2. In an automatic reclosing circuit breaker system, an electric circuit, a circuit breaker in said circuit, overload responsive means for effecting the opening of said circuit breaker, control means operative to effect the next reclosure of said circuit breaker after a predetermined time interval each time said circuit breaker is opened, control means operative to effect the next reclosure of said circuit breaker after a different predetermined time interval each time said circuit breaker is opened, and means controlled by the severity of the overload which causes the circuit breaker to open for selectively determining which of said control means will effect the next reclosure of said circuit breaker.

3. In an automatic reclosing circuit breaker system, an electric circuit, a circuit breaker in said circuit, a plurality of reclosing devices arranged to effect the reclosing of said circuit breaker with different predetermined time intervals between the opening of the circuit breaker and its reclosure, and means controlled by the condition of said circuit for selectively controlling the operation of said reclosing devices.

4. In an automatic reclosing circuit breaker system, an electric circuit, a circuit breaker in said circuit, means responsive to a predetermined abnormal condition of said circuit for effecting the opening of said circuit breaker, means responsive to the opening of said circuit breaker for effecting the successive reclosing of said circuit breaker with predetermined time intervals between successive reclosures, and means responsive to another predetermined abnormal condition of said circuit for rendering said reclosing means inoperative and for effecting the reclosing of said circuit breaker with a different predetermined time interval between the opening and the subsequent reclosure of the circuit breaker.

5. In an automatic reclosing circuit breaker system, an electric circuit, a circuit breaker in said circuit, means responsive to a predetermined value of current in said circuit for effecting the opening of said circuit breaker, reclosing means responsive to the opening of said circuit breaker normally arranged to effect the reclosure of said circuit breaker after it has been open a predetermined length of time, other reclosing means adapted to effect the reclosure of said circuit breaker after it has been open a different predetermined length of time, and means responsive to a different value of current in said electric circuit for rendering said first mentioned reclosing means inoperative to effect the reclosure of said circuit breaker and for rendering said second mentioned reclosing means operative to effect the reclosure of said circuit breaker.

6. In an automatic reclosing circuit breaker system, an electric circuit, a circuit breaker in said circuit, means responsive to a predetermined abnormal current in said circuit for effecting the opening of said circuit breaker, reclosing means responsive to the opening of said circuit breaker normally arranged to effect the reclosure of said circuit breaker a predetermined number of times with predetermined time intervals between successive reclosures, other reclosing means adapted to effect the reclosure of said circuit breaker a predetermined number of times with predetermined time intervals between the opening and the reclosure of the circuit breaker, and means responsive to another predetermined abnormal current in said electric circuit for rendering said first mentioned reclosing means inoperative to effect the reclosure of said circuit breaker and for rendering said second mentioned reclosing means operative to effect the reclosure of said circuit breaker.

7. In an automatic reclosing circuit breaker system, an electric circuit, a circuit breaker in said circuit, means responsive to a predetermined abnormal current in said circuit for effecting the opening of said circuit breaker, reclosing means responsive to the opening of said circuit breaker normally arranged to effect the reclosure of said circuit breaker after it has been open a predetermined length of time, other reclosing means adapted to effect the reclosure of said circuit breaker after it has been open a different predetermined length of time, means responsive to another predetermined abnormal current in said electric circuit for rendering said first mentioned reclosing means inoperative to effect the reclosure of said circuit breaker and for rendering said second mentioned reclosing means operative to effect the reclosure of said circuit breaker, and means controlled by said second mentioned reclosing means and the circuit breaker for restoring the control of the reclosing of said circuit breaker to the control of said first mentioned reclosing means.

8. In an automatic reclosing circuit breaker system, an electric circuit, a circuit breaker in said circuit, means responsive to a predetermined abnormal current in said circuit for effecting the opening of said circuit breaker, reclosing means responsive to the opening of said circuit breaker normally arranged to effect the reclosure of said circuit breaker after it has been open a predetermined length of time, other reclosing means adapted to effect the reclosure of said circuit breaker after it has been open a different predetermined length of time, means responsive to another predetermined abnormal current in said circuit for rendering said first mentioned means inoperative to effect the reclosure of said circuit breaker and for rendering said second mentioned reclosing means operative to effect the reclosure of said circuit breaker, locking means associated with said last mentioned abnormal current responsive means, and means controlled by said second mentioned reclosing means and said circuit breaker for controlling said locking means.

9. In an automatic reclosing circuit breaker system, an electric circuit, a circuit breaker in said circuit, means responsive to a predetermined abnormal current in said circuit for effecting the opening of said circuit breaker, reclosing means responsive to the opening of said circuit breaker normally arranged to effect the reclosure of said circuit breaker after it has been open a predetermined length of time, other reclosing means adapted to effect the reclosure of said circuit breaker after it has been open a different predetermined length of time, means responsive to another predetermined abnormal current in said circuit for rendering said first mentioned means inoperative to effect the reclosure of said circuit breaker and for rendering said second mentioned reclosing means operative to effect the reclosure of said circuit breaker, locking means for maintaining said last mentioned abnormal current responsive means in its actuated position after said circuit breaker has opened, and means responsive to predetermined conditions of said second mentioned reclosing means and said circuit breaker for effecting the release of said locking means to restore the control of the reclosing of said circuit breaker to said first mentioned means.

In witness whereof, I have hereunto set my hand this 27th day of November, 1926.

ARVID E. ANDERSON.